(12) United States Patent
Akamine et al.

(10) Patent No.: US 8,609,562 B2
(45) Date of Patent: Dec. 17, 2013

(54) PLATE BRICK PRODUCTION METHOD AND PLATE BRICK

(75) Inventors: Keiichiro Akamine, Fukuoka (JP); Katsumi Morikawa, Fukuoka (JP); Joki Yoshitomi, Fukuoka (JP); Tsuneo Kayama, Fukuoka (JP)

(73) Assignee: Krosakiharima Corporation, Fukuoka (JP)

( * ) Notice: Subject to any disclaimer, the term of this patent is extended or adjusted under 35 U.S.C. 154(b) by 191 days.

(21) Appl. No.: 13/139,338

(22) PCT Filed: Dec. 18, 2009

(86) PCT No.: PCT/JP2009/071124
§ 371 (c)(1),
(2), (4) Date: Jun. 13, 2011

(87) PCT Pub. No.: WO2010/071196
PCT Pub. Date: Jun. 24, 2010

(65) Prior Publication Data
US 2011/0241267 A1      Oct. 6, 2011

(30) Foreign Application Priority Data
Dec. 18, 2008   (JP) ................................. 2008-322609

(51) Int. Cl.
*C04B 35/80* (2006.01)
*C04B 35/581* (2006.01)

(52) U.S. Cl.
USPC ........ 501/98.4; 501/95.1; 501/95.2; 501/105; 501/127

(58) Field of Classification Search
USPC ....................... 501/105, 127, 98.4, 95.1, 95.2
See application file for complete search history.

(56) References Cited

U.S. PATENT DOCUMENTS 3,236,663 A * 2/1966 Grulke et al. ................. 501/96.3
3,492,153 A * 1/1970 Ervin, Jr ..................... 428/307.7
(Continued)

FOREIGN PATENT DOCUMENTS

JP      57027971 A      2/1982
JP       6206759 A      7/1994
(Continued)

OTHER PUBLICATIONS

English translation of International Search Report published Jun. 24, 2010 for PCT/JP2009/071124 filed Dec. 18, 2009.

(Continued)

*Primary Examiner* — Karl Group
(74) *Attorney, Agent, or Firm* — Fleit Gibbons Gutman Bongini & Bianco PL; Martin Fleit; Paul D. Bianco

(57) ABSTRACT

Disclosed is a method of producing a plate brick, which comprises: adding an organic binder to a refractory raw material mixture containing aluminum and/or an aluminum alloy; kneading them; forming the kneaded mixture into a shaped body; and burning the shaped body in a nitrogen gas atmosphere at a temperature of 1000 to 1400° C., wherein: when a temperature of a furnace atmosphere is 300° C. or more, the atmosphere is set to a nitrogen gas atmosphere; and when the temperature of the furnace atmosphere is 1000° C. or more, an oxygen gas concentration in the atmosphere is maintained at 100 volume ppm or less, and a sum of a carbon monoxide gas concentration and a carbon dioxide gas concentration is maintained at 1.0 volume % or less. This makes it possible to form a large amount of fine and uniform aluminum nitride in a plate brick to prevent microstructural degradation due to hydration caused by formation of aluminum carbide and suppress oxidation of a carbon bond so as to improve surface-roughening resistance.

5 Claims, 3 Drawing Sheets

(56) References Cited

U.S. PATENT DOCUMENTS 4,332,755 A * 6/1982 Murata ............ 264/29.6
5,286,685 A * 2/1994 Schoennahl et al. ......... 501/98.6

FOREIGN PATENT DOCUMENTS

| JP | 08208313 | * | 8/1996 |
| JP | 10139527 | A | 5/1998 |
| JP | 2000107839 | A | 4/2000 |
| JP | 2000319070 | * | 11/2000 |
| JP | 2003171187 | A | 5/2003 |
| JP | 2003277129 | A | 10/2003 |
| JP | 2009204594 | | 9/2009 |

OTHER PUBLICATIONS

Keiichiro Akamine, Katsumi Morikawa, Jouki Yoshitomi, Tsuneo Kayama; Development of the high durable SN plate material (WRX series) and the evaluation technology; Taika Zairyo; Dec. 12, 2008; No. 156; pp. 45 to 52.

International Preliminary Report published Jun. 21, 2011 for PCT/JP2009/071124 filed Dec. 18, 2009 (with English translation published Jul. 5, 2007).

Written Opinion of the International Search Authority published Jun. 18, 2011 for PCT/JP2009/071124 filed Dec. 18, 2009 (with English translation published Jul. 5, 2007).

\* cited by examiner

TABLE 1

| | | Inventive Example 1 | Inventive Example 2 | Inventive Example 3 | Comparative Example 1 | Comparative Example 2 | Inventive Example 4 | Inventive Example 5 | Comparative Example 3 |
|---|---|---|---|---|---|---|---|---|---|
| Refractory raw material mixture (mass%) | | | | | | | | | |
| fused alumina | 3~1mm | 20 | 20 | 20 | 20 | 20 | 20 | 20 | 20 |
| fused alumina | 1mm or less | 30 | 30 | 30 | 30 | 30 | 30 | 30 | 30 |
| zirconia-mullite | 3~1mm | 33 | 33 | 33 | 33 | 33 | 33 | 33 | 33 |
| calcined alumina | average particle size: 1 μm | 10 | 10 | 10 | 10 | 10 | 10 | 10 | 10 |
| carbon black | 200 μm or less | 2 | 2 | 2 | 2 | 2 | 2 | 2 | 2 |
| Al powder (Al: 99.9 mass%) | 200 μm or less | 5 | 5 | 5 | 5 | 5 | 5 | 5 | 5 |
| Al–Si powder (Al: 85 mass%) | 200 μm or less | | | | | | | | |
| Al–Mg powder (Al: 85 mass%) | 200 μm or less | | | | | | | | |
| Si powder | 200 μm or less | | | | | | | | |
| aluminum nitride | 200 μm or less | | | | | | | | |
| Binder | | | | | | | | | |
| phenolic resin (mass %*1) | | (4) | (4) | (4) | (4) | (4) | (4) | (4) | (4) |
| Measurement result of atmosphere gas | | | | | | | | | |
| oxygen gas concentration [volume ppm] | | 8 | 50 | 100 | 200 | 500 | 100 | 50 | 70 |
| O-containing gas (CO + CO2) [volume%] | | 0 | 0 | 0 | 0.1 | 0.2 | 0.5 | 1.0 | 2.0 |
| Evaluation result | | | | | | | | | |
| amount of formed aluminum nitride (mass%) | | 2.0 | 1.9 | 1.8 | 1.3 | 1.2 | 1.7 | 1.7 | 1.2 |
| nitrogen content (mass%) | | 0.68 | 0.65 | 0.61 | 0.44 | 0.41 | 0.58 | 0.58 | 0.41 |
| carbon content (mass%) | | 4.0 | 3.8 | 3.7 | 3.2 | 3.0 | 3.5 | 3.6 | 3.2 |
| specific problem | | | | | 1.5 | 12 | 11.2 | 11 | 12.5 |
| apparent porosity (%) | | 10 | 10.2 | 10.5 | 120 | 125 | 107 | 108 | 130 |
| oxidation resistance *2 (index) | | 100 | 102 | 105 | 1550 | 1700 | 950 | 950 | 1700 |
| oxidation resistance *3 (μm) | | 500 | 650 | 800 | 97 | 96 | 95 | 100 | 125 |
| hydration resistance (index) | | 100 | 100 | 98 | 0.39 | 0.38 | 0.38 | 0.40 | 0.51 |
| hydration resistance weight-increasing rate (%) | | 0.40 | 0.40 | 0.39 | 4.4 | 3.2 | 5.0 | 5.0 | 3.2 |
| number of usable cycles in actual furnace test (cycle) | | 5.4 | 5.0 | 5.2 | | | | | |

*1: mass% to be added to 100 mass% of refractory raw material mixture
*2: evaluation using rotary furnace
*3: evaluation using high-frequency induction furnace

FIG. 3

TABLE 1-Continued

| | Comparative Example 4 | Comparative Example 5 | Comparative Example 6 | Inventive Example 6 | Inventive Example 7 | Inventive Example 8 | Inventive Example 9 | Inventive Example 10 |
|---|---|---|---|---|---|---|---|---|
| Refractory raw material mixture (mass%) | | | | | | | | |
| fused alumina  3~1mm | 20 | 20 | 20 | 20 | 20 | 20 | 20 | 20 |
| fused alumina  1mm or less | 30 | 30 | 30 | 30 | 30 | 30 | 30 | 17 |
| zirconia-mullite  3~1mm | 33 | 33 | 33 | 33 | 33 | 33 | 33 | 33 |
| calcined alumina  average particle size: 1 μm | 10 | 10 | 10 | 9 | 8 | 9 | 9 | 10 |
| carbon black  200 μm or less | 2 | 2 | 2 | 2 | 2 | 2 | 2 | 2 |
| Al powder (Al: 99.9 mass%)  200 μm or less | 5 | | 5 | 5 | 5 | | | 18 |
| Al-Si powder (Al: 85 mass%)  200 μm or less | | | | | | | | |
| Al-Mg powder (Al: 85 mass%)  200 μm or less | | | | 1 | | 6 | 6 | |
| Si powder  200 μm or less | | | | | 2 | | | |
| aluminum nitride  200 μm or less | | 5 | | | | | | |
| Binder | | | | | | | | |
| phenolic resin (mass *1) | (4) | (4) | (4) | (4) | (4) | (4) | (4) | (4) |
| Measurement result of atmosphere gas | | | | | | | | |
| oxygen gas concentration [volume ppm] | 80 | 100 | — | 8 | 8 | 8 | 8 | 8 |
| C-containing gas (CO + $CO_2$) [volume%] | 5.0 | 0 | — | 0 | 0 | 0 | 0 | 0 |
| Evaluation result | | | | | | | | |
| amount of formed aluminum nitride (mass%) | 1.1 | 0.0 | 1.0 | 2.0 | 2.0 | 2.1 | 1.8 | 7.1 |
| nitrogen content (mass%) | 0.38 | 0.00 | 0.34 | 0.68 | 0.68 | 0.72 | 0.61 | 2.42 |
| carbon content (mass%) | 2.8 | 4.0 | 4.2 | 4.0 | 4.0 | 4.0 | 4.0 | 4.0 |
| specific problem | | | crack | | | | | |
| apparent porosity (%) | 12.8 | 12.5 | 13.5 | 9.8 | 9.6 | 9.5 | 10.5 | 13 |
| oxidation resistance *2 (index) | 155 | 135 | 180 | 95 | 90 | 85 | 92 | 50 |
| oxidation resistance *3 (μm) | 1850 | 3000 | 2000 | 500 | 500 | 350 | 800 | 200 |
| hydration resistance (index) | 135 | 135 | 200 | 55 | 45 | 105 | 110 | 140 |
| hydration resistance weight-increasing rate (%) | 0.54 | 0.54 | 0.80 | 0.22 | 0.18 | 0.42 | 0.44 | 0.56 |
| number of usable cycles in actual furnace test (cycle) | 3.2 | 3.2 | — | 5.4 | 5.4 | 5.2 | 5.2 | |

*1: mass% to be added to 100 mass% of refractory raw material mixture
*2: evaluation using rotary furnace
*3: evaluation using high-frequency induction furnace

FIG. 3-continued

PLATE BRICK PRODUCTION METHOD AND PLATE BRICK

TECHNICAL FIELD

The present invention relates to a plate brick for use in a sliding nozzle device adapted to control a flow rate of molten metal, and a method of producing the plate brick.

BACKGROUND ART

In production of steel, a sliding nozzle device is employed to control a flow rate of molten steel to be discharged from a molten metal vessel, such as a ladle or a tundish. In the sliding nozzle device, two or three refractory plate bricks having a nozzle hole are used. The plate bricks are disposed in superimposed relation and adapted to be slidably moved with respect to each other while applying a surface pressure therebetween, to adjust an opening degree of the nozzle hole so as to adjust the flow rate of molten steel.

Typically, the plate brick is made of an alumina-carbon material, and classified into a burned type and an unburned type according to a production method thereof. The burned type is used as a relatively large-size plate brick, because it is excellent in strength although a cost thereof becomes higher than that of the unburned type.

In many cases, a usable life of the plate brick is determined by damage imposed on a sliding surface serving as an operating surface. It has been considered that a causal factor of the damage of the sliding surface of the plate brick (hereinafter "surface roughing") includes a loosening of the microstructure due to thermal shock, a chemical reaction with molten steel, abrasion due to sliding, and oxidation of carbon bonds.

As a technique for improving surface-roughening resistance, for example, with a view to improving thermal shock resistance, a refractory raw material having a low thermal expansion coefficient, such as zirconia-mullite or alumina-zirconia, is used. Further, with a view to improving corrosion resistance, it is studied to use a high-purity and dense raw material less likely to react with slag, such as fused alumina, and adequately select/set a type and an amount of carbon. With a view to improving sliding abrasion resistance, for example, a technique of adequately setting a particle size distribution of a raw material to obtain a dense microstructure and therefore achieve higher strength, and a technique of improving polishing accuracy of the sliding surface, are implemented. With a view to preventing oxidation, addition of an antioxidant, such as silicon carbide, boron carbide or aluminum nitride, is performed.

As above, with a view to improving the surface-roughening resistance of the plate brick, a combination of various refractory raw materials is studied. In parallel therewith, improvement in a production method, such as a burning condition, is also studied.

For example, as a typical production method for a burned-type plate brick, there has been known a method which comprises: adding an organic binder to a refractory raw material mixture containing metal such as silicon; kneading them; forming the kneaded mixture into a shaped body; and burning the shaped body at 1000° C. or more under a condition that it is placed in a container filled with coke particles. A bonding microstructure of this burned-type plate brick is comprised mainly of a carbon bond and a silicon carbide bond, wherein an oxide-based sintered bond and others are entangled therewith. The carbon bond has a low elastic modulus and excellent thermal shock resistance, as compared with a ceramic bond, and the silicon carbide bond has an effect of imparting strength and oxidation/abrasion resistances, so that the bonding microstructure exhibits excellent properties capable of suppressing damage during use. However, if silicon carbide is oxidized, it is transformed into $SiO_2$, which will react with a foreign component, such as FeO or CaO, to form a low melting-point material, causing deterioration in corrosion resistance. Moreover, there is a problem that $SiO_2$ is likely to vanish as SiO gas under high temperatures, and thereby it is difficult to sustain the above effect over long hours of use.

In the burned type, it is also known to use aluminum instead of silicon. For example, Patent Document 1 (JP 57-27971 A) discloses a technique of forming a shaped body using a refractory raw material mixture containing aluminum, and burning the shaped body within carbon in a reducing atmosphere to obtain an aluminum carbide or aluminum nitride-based reaction-sintered bond. It is described that an obtained plate brick is excellent in mechanical strength and corrosion resistance as compared with the conventional carbon bond-type.

However, when a plate brick of a type which includes an aluminum nitride bond based on addition of aluminum, as disclosed in the Patent Document 1 (JP 57-27971 A), is burned within carbon in a reducing atmosphere, a large amount of aluminum carbide is formed, which causes a problem of deterioration in hydration resistance. Specifically, in cases where a plate brick is detached for reason of operational schedules or the like and then reused, it will be left in a storage area for a certain period of time until subsequent use. Thus, the aluminum carbide is hydrated by water vapor in ambient air, to cause a problem of deterioration in strength and durability of the plate brick. Further, in cases where a plate brick is collected after use and then recycled, the collected plate brick is re-subjected to grinding or machining. Thus, the aluminum carbide is hydrated by water during the machining, to cause deterioration in strength and durability of the plate brick. The Patent Document 1 (JP 57-27971 A) also discloses a technique of burning the shaped body in a nitrogen gas atmosphere. However, if the burning is performed simply in the nitrogen gas atmosphere, the formation of aluminum nitride will be hindered by gases, such as CO and $CO_2$, in volatile matter generated by decomposition of a binder, such as a phenolic resin, contained in the shaped body as an object to be burned. Thus, the effect of improving the surface-roughening resistance of a plate brick becomes insufficient, so that it cannot expect to obtain the effect at a desired level.

As for the burning condition, Patent Document 2 (JP 2003-171187 A) discloses a technique of burning and weakly oxidizing a shaped body in an atmosphere having an oxygen gas partial pressure of 10 to 10000 ppm.

However, even if the plate brick including an aluminum nitride bond based on addition of aluminum is burned under the burning condition disclosed in Patent Document 2 (JP 2003-171187 A), the formation of aluminum nitride will be hindered by gases, such as CO and $CO_2$, in volatile matter generated by decomposition of a binder, such as a phenolic resin, contained in the shaped body as an object to be burned, as mentioned above. Thus, the yield of aluminum nitride is reduced, and thereby the oxidation resistance (surface-roughening resistance)-improving effect cannot be obtained at a satisfactory level.

Moreover, in the burning condition disclosed in the Patent Document 2 (JP 2003-171187 A), the presence of CO and $CO_2$ is permitted (see the paragraph [0022] in Patent Document 2 (JP 2003-171187 A)). However, if CO and $CO_2$ exist in the burning atmosphere in a large amount, there is a problem that the formation of aluminum nitride based on a reaction between nitrogen gas and aluminum is hindered.

As above, although the surface-roughening resistance of a plate brick is being improved by a combination of raw materials and a burning condition, the conventional techniques have the above problems. Thus, even now, a key factor of the usable life of the plate brick is still surface roughening.

PRIOR ART DOCUMENTS

Patent Documents

Patent Document 1: JP 57-27971A
Patent Document 2: JP 2003-171187A

SUMMARY OF THE INVENTION

Problem to be Solved by the Invention

It is an object of the present invention to improve oxidation resistance of a burned-type plate brick, particularly, a plate brick having an aluminum nitride bond, to improve surface-roughening resistance thereof.

Means for Solving the Problem

From an analysis result of used plate bricks, the inventor assumed that, as measures against surface roughening, it is necessary to suppress microstructural degradation due to oxidation and vanishment of a carbon-based raw material and a carbon bond during use, and, for this purpose, it is critical to improve oxidation resistance of the carbon bond. Then, on an assumption that aluminum nitride has a higher effect as an antioxidant than silicon carbide and boron carbide, the inventor focused on a plate brick having an aluminum nitride bond in order to enhance oxidation resistance of a plate brick. Further, as a result of various researches on a burning condition for the plate brick, the inventor has found that a small amount of gas other than nitrogen gas during burning has a great impact on the oxidation resistance of the plate brick.

Specifically, the present invention provides a method of producing a plate brick. The method comprises: adding an organic binder to a refractory raw material mixture containing aluminum and/or an aluminum alloy; kneading them; forming the kneaded mixture into a shaped body; and burning the shaped body in a nitrogen gas atmosphere at a temperature of 1000 to 1400° C., wherein: at least when a temperature of a furnace atmosphere is 300° C. or more, the atmosphere is set to a nitrogen gas atmosphere; and when the temperature of the furnace atmosphere is 1000° C. or more, an oxygen gas concentration in the atmosphere is maintained at 100 volume ppm or less, and a sum of a carbon monoxide gas concentration and a carbon dioxide gas concentration is maintained at 1.0 volume % or less.

Features of the present invention will be specifically described below.

The organic binder, such as a phenolic resin, is contained in the shaped body to be burned as the plate brick. Thus, when the shaped body is heated, water is produced by condensation of the organic binder. When a temperature of the shaped body is further increased, a part of the organic binder is decomposed to generate water vapor, carbon monoxide gas, carbon dioxide gas and hydrocarbon-based gas. Ambient air is likely to be continually mixed in a burning atmosphere, wherein oxygen gas, carbon dioxide gas and water vapor are contained in the ambient air. Oxygen gas, carbon monoxide gas or carbon dioxide gas reacts with aluminum in the plate brick during burning to form aluminum oxide which hinders the formation of aluminum nitride.

Further, during burning, molten aluminum or a gasified aluminum reacts with nitrogen gas within the plate brick from about 1000° C. to start forming aluminum nitride. Therefore, as a prerequisite to improving the yield of aluminum nitride, it is necessary to reduce a concentration of oxygen gas, carbon monoxide gas and carbon dioxide gas which are gases hindering the formation of aluminum nitride at 1000° C. or more. Specifically, the oxygen gas concentration is set to 100 volume ppm or less, and a sum of the carbon monoxide gas concentration and the carbon dioxide gas concentration is set to 1.0 volume % or less.

Aluminum is oxidized by even a small amount of oxygen gas, because oxygen gas has a high reactivity with aluminum. Thus, the oxygen gas concentration is preferably minimized, and may be zero. If the oxygen gas concentration is greater than 100 volume ppm, an amount of formed aluminum nitride becomes insufficient, and thereby the oxidation resistance becomes insufficient.

Although each of carbon monoxide gas and carbon dioxide gas has a reactivity fairly less than that of oxygen gas, it also reacts with aluminum to form aluminum oxide. Thus, the carbon monoxide or dioxide gas concentration is preferably minimized, and may be zero. If the sum of the carbon monoxide gas concentration and the carbon dioxide gas concentration is greater than 1.0 volume %, an amount of formed aluminum nitride becomes insufficient, and thereby the oxidation resistance becomes insufficient.

If the burning temperature is less than 1000° C., an amount of formed aluminum nitride becomes insufficient. If the burning temperature is greater than 1400° C., a ceramic bond is excessively developed to provide high elasticity, which causes deterioration in thermal shock resistance.

In the plate brick to be produced under the above conditions, aluminum molten or gasified during burning reacts with nitrogen gas in the atmosphere, within a matrix thereof, to form aluminum nitride. This point is evidenced by the fact that aluminum nitride has a fine fiber-like shape with a diameter of 0.1 to 0.2 μm, and fills a space in the microstructure, as shown in FIG. 1 which is a result of SEM observation of a plate brick according to the present invention.

Aluminum nitride in the plate brick according to the present invention exists in the above form, and therefore has extremely high activity. Specifically, carbon in the operating surface of the plate brick during use is oxidized by FeO or other component in molten steel, and resulting CO gas immediately reacts with the aluminum nitride. Thus, alumina and carbon are produced, and a new microstructure is formed by the alumina and the carbon, so that the matrix microstructure is densified. Based on this mechanism, oxidized carbon is reproduced, and a surface microstructure is densified to suppress penetration of FeO and other component in molten steel. This would make it possible to suppress oxidation of a carbon bond to improve oxidation resistance and therefore impart surface-roughening resistance.

On the other hand, in cases where aluminum nitride in powder form is added to a refractory raw material mixture as in the conventional technique, it is difficult to uniformly disperse the added aluminum nitride, and the added aluminum nitride has a large particle size. Thus, as compared with aluminum nitride formed by a reaction, the added aluminum nitride is inferior in contribution to improvement in oxidation resistance, and incapable of forming a bonding microstructure.

In the plate brick production method of the present invention, the refractory raw material mixture may contain one or more selected from the group consisting of zirconia, zirconia-mullite and alumina-zirconia, in an amount of 4 to 20 mass %, as a $ZrO_2$ component.

In the typical conventional plate brick production method where burning is performed under a condition that an object to be burned is buried in coke particles, if a zirconia-containing raw material is used in a refractory raw material mixture containing aluminum and/or an aluminum alloy, crack is likely to occur in a burned product. Although the reason for this phenomenon is not clarified, it is assumed as follows. Oxygen gas in coke particles reacts with the coke under high temperatures to produce carbon monoxide gas, and aluminum as a strong reducing agent is contained in the object, so that pores in the plate brick are placed in a strong reducing atmosphere. Under the strong reducing atmosphere at high temperatures, zirconia is likely to be reduced to form zirconium or zirconium carbide. Then, the zirconium or zirconium carbide forms zirconia through a severe reaction with a small amount of oxygen gas, wherein the reaction involves a significant volume change which causes the occurrence of crack.

Differently, in the plate brick production method of the present invention, even if a zirconia-containing raw material is used, no crack occurs in a burned product. This would be because a burning atmosphere is comprised mainly of nitrogen gas, and a reducing gas concentration, such as a carbon monoxide gas concentration, is as low as 1.0 volume % or less, so that a strong reducing atmosphere is not formed, and thereby the formation of zirconium or zirconium carbide is suppressed. Thus, a plate brick obtained by the plate brick production method of the present invention can have a thermal shock resistance-improving effect based on a zirconia-containing raw material, so that the surface-roughening resistance is drastically enhanced.

If the amount of one or more selected from the group consisting of zirconia, zirconia-mullite and alumina-zirconia to be contained in the refractory raw material mixture as a $ZrO_2$ component is less than 4 mass %, the thermal shock resistance-improving effect cannot be sufficiently obtained. If the amount is greater than 20 mass %, FeO resistance will deteriorate, which is likely to cause deterioration in durability.

In the plate brick production method of the present invention, the refractory raw material mixture may contain silicon in an amount of 0.5 to 5 mass %. In cases where aluminum is added to a refractory raw material mixture containing carbon, it is known that aluminum molten during burning reacts with carbon to partially form aluminum carbide. Aluminum carbide is easily hydrated to cause break-up of the microstructure. However, it is known that, if silicon is added to aluminum carbide, it will be incorporated in the aluminum carbide as a solid solution to allow the aluminum carbide to become less likely to be hydrated. This makes it possible to improve hydration resistance. If the amount of silicon is less than 0.5 mass %, an anti-hydration effect cannot be sufficiently obtained. If the amount is greater than 5 mass %, FeO resistance and CaO resistance will deteriorate, which is likely to cause deterioration in durability.

The present invention also provides a plate brick which contains aluminum nitride in an amount of 1.5 to 7.0 mass %, and has a hydration reaction-induced weight-increasing rate of 0.5% or less as measured after holding at 150° C. for 3 hours under a pressure of 0.49 MPa, in a hydration test using an autoclave.

A metal, such as aluminum, an aluminum alloy or silicon, mixed in the refractory raw material, forms carbide, nitride or oxide, such as aluminum carbide, aluminum nitride, alumina, silicon carbide, silicon nitride or silica, during burning.

Among them, aluminum nitride immediately reacts with CO gas generated in such a manner that carbon in the operating surface of the plate brick during use is oxidized by FeO or other component in molten steel. Thus, alumina and carbon are produced, which allows a matrix microstructure to be densified. Therefore, aluminum nitride has a high oxidation resistance effect. This oxidation resistance effect cannot be obtained from alumina. A higher oxidation resistance effect can be obtained as an amount of formed aluminum nitride becomes larger. If the amount of formed aluminum nitride is less than 1.5 mass %, the oxidation resistance effect cannot be sufficiently obtained. Although the same oxidation resistance effect can be expected from aluminum carbide, aluminum carbide generates gas, such as methane, carbide or acetylene, to form aluminum hydroxide, through a hydration reaction. This reaction involves volume expansion which causes crack and break-up, so that it becomes difficult to use the plate brick as a refractory product. As a result of the hydration reaction of aluminum carbide, aluminum hydroxide is formed. Thus, a weight of the plate brick is increased. If the weight-increasing rate in the hydration test using an autoclave is greater than 0.5%, a trouble, such as peeling of or crack in a hydrated surface, will occur during long-term storage or during re-use or recycle-use in an actual furnace, and thereby the above effect cannot be sufficiently obtained.

Aluminum nitride is less likely to induce a hydration reaction as compared with aluminum carbide. However, if aluminum nitride is contained in a large amount, it generates ammonia gas through a hydration reaction, to form aluminum hydroxide. As a result of this hydration reaction, aluminum hydroxide is formed, so that a weight of the plate brick is increased, in the same manner as that in aluminum carbide. If the amount of aluminum nitride is greater than 7.0 mass %, the hydration reaction-induced weight-increasing rate becomes greater than 0.5%, a trouble, such as peeling of or crack in a hydrated surface, will occur during long-term storage or during re-use or recycle-use in an actual furnace, and thereby the above effect cannot be sufficiently obtained.

Preferably, in the plate brick of the present invention, a thickness of a decarburized layer in an operating surface thereof is 1500 µm or less as measured after a reaction with molten steel adjusted to have an oxygen concentration of 30 to 120 mass ppm and a temperature of 1550 to 1650° C., for 300 minutes.

The thickness of the decarburized layer is an index of oxidation resistance. Specifically, based on an oxidation resistance evaluation method disclosed in JP 2009-204594A, a refractory product is subjected to a reaction with molten steel adjusted to have an oxygen concentration of 30 to 120 mass ppm and a temperature of 1550 to 1650° C., for 300 minutes, and a maximum value of the thickness of the decarburized layer in the operating surface is evaluated. In the oxidation resistance evaluation method, carbon in the refractory product is oxidized by oxygen in the molten steel, to form the decarburized layer. When an amount of formed aluminum nitride is relatively large, carbon monoxide generated by the oxidation reacts with the aluminum nitride to form a dense alumina layer and deposit carbon, so that the formation of the decarburized layer is suppressed. When the maximum thickness of the decarburized layer is 1500 µM or less, the oxidation of the sliding surface is suppressed to reduce damage of the sliding surface, even in an actual furnace. However, if the maximum thickness is greater than 1500 µm, decarburization due to oxygen in molten steel is accelerated, and thereby the above effect cannot be sufficiently obtained.

The plate brick of the present invention can be obtained by the plate brick production method of the present invention.

Effect of the Invention

The plate brick obtained by the present invention is excellent in oxidation resistance, so that it becomes possible to improve surface-roughening resistance and therefore durability thereof.

BRIEF DESCRIPTION OF THE DRAWINGS

FIG. 3 shows Table 1.

DESCRIPTION OF EMBODIMENTS

Figure 1:
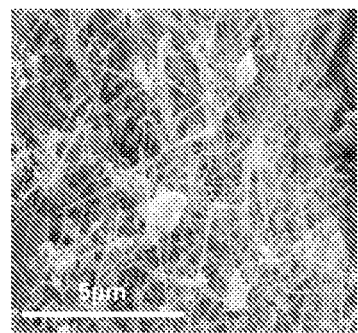
FIG. 1 shows a result of SEM observation of a plate brick obtained by a plate brick production method according to the present invention.

Aluminum and/or an aluminum alloy which are commonly used in production of plate bricks, can be used without a particular problem. The aluminum alloy may be an alloy of aluminum and at least one of silicon and magnesium. Among such aluminum alloys, it is preferable to use an Al—Mg alloy, an Al—Si alloy or an Al—Mg—Si alloy which contains Al in an amount of 50 mass % or more, in view of a high yield of aluminum nitride. It is preferable to use aluminum and/or an aluminum alloy in powder form which has a particle size of 200 μm or less, because it can provide more excellent oxidation resistance to a plate brick to be produced.

Aluminum and/or an aluminum alloy is contained in a refractory raw material mixture, preferably in an amount of 1 to 10 mass %, more preferably in an amount of 2 to 5 mass %, in terms of aluminum. If the amount is less than 1 mass %, aluminum nitride becomes insufficient, and thereby oxidation resistance is likely to become insufficient. If the amount is greater than 10 mass %, the formation of aluminum nitride becomes excessive to provide high strength and high elastic modulus, which causes deterioration in thermal shock resistance. Moreover, hydrogen resistance is likely to deteriorate. Further, a large volume change occurs during burning, which is likely to cause a problem, such as the occurrence of crack in a burned product.

In a plate brick production method, a refractory raw material mixture containing aluminum and/or an aluminum alloy is used. As a refractory raw material other than the aluminum and/or aluminum alloy, any refractory raw material used for conventional plate bricks may be used. For example, the refractory raw material may be comprised mainly of a metal oxide, and includes one or more selected from the group consisting of a metal nitride, a metal carbide, a metal except for aluminum and an aluminum alloy, and a carbon-based material. More preferably, the refractory raw material mixture may comprise 80 to 98 mass % of a metal oxide, and 1 to 10 mass % of one or more selected from the group consisting of a metal nitride, a metal carbide, a metal except for aluminum and an aluminum alloy, and a carbon-based material.

The metal oxide may be one or more selected from the group consisting of alumina, mullite, zirconia-mullite, alumina-zirconia, magnesia, spinel, clay, glass and brick debris. The metal nitride may be one or more selected from the group consisting of silicon nitride, aluminum nitride and boron nitride. The metal carbide may be one or more of silicon carbide and boron carbide. The metal except for aluminum and an aluminum alloy may be one or more selected from the group consisting of silicon, magnesium, iron and nickel and an alloy thereof. The carbon-based material may be one or more selected from the group consisting of pitch, tar, carbon black and graphite.

As the metal oxide, it is more preferably to use alumina in an amount of 50 to 80 mass %. Alumina is capable of enhancing corrosion resistance. In cases where it is necessary to give higher priority to corrosion resistance, magnesia or spinel may be used as the metal oxide.

While an organic binder may be any type commonly used for imparting strength during shaping and forming a carbon bond, it is preferable to use a thermosetting organic binder. Specifically, at least one of a phenolic resin and a furan resin may be used after diluting it with a solvent, such as phenol, ethylene glycol or ethanol, to adjust viscosity thereof. Alternatively, a phenolic resin and a furan resin in powder form may be used independently or in combination.

In the present invention, the organic binder is added to the refractory raw material mixture containing aluminum and/or an aluminum alloy, and they are kneaded in a conventional usual manner. Then, the kneaded mixture is formed into a shaped body as an object to be burned. Burning is performed in a nitrogen gas atmosphere.

A burning furnace may be a batch furnace or may be a continuous furnace. In either case, any type may be used as long as it is capable of preventing intrusion of gas other than nitrogen gas, such as ambient air or combustion gas, and controlling a supply amount of nitrogen gas, a discharge amount of furnace gas, and a burning temperature. The burning furnace may be any type which is known as a burning furnace for a refractory or ceramic material, and commercially available.

During burning, when a temperature of a furnace atmosphere is 300° C. or more at lowest, the furnace atmosphere is set to a nitrogen gas atmosphere in order to prevent oxidation of the object. When the furnace atmosphere temperature is less than 300° C., the furnace atmosphere may be set to an ambient air atmosphere. However, considering complexity due to a need for changing a furnace atmosphere in the middle of the burning, it is more preferable that the furnace atmosphere is set to a nitrogen gas atmosphere during a period between start and end of the burning.

In the course of heating, when the furnace atmosphere temperature is less than 1000° C., gas is generated from the binder. Thus, the burning may be performed while discharging furnace gas and supplying nitrogen gas.

When the furnace atmosphere temperature is 1000° C. or more, the furnace atmosphere is controlled based on the supply amount of nitrogen gas and the discharge amount of furnace gas, to allow an oxygen gas concentration in the atmosphere to be maintained at 100 volume ppm or less, and allow a sum of a carbon monoxide gas concentration and a carbon dioxide gas concentration to be maintained at 1.0 volume % or less. More preferably, when the furnace atmosphere temperature is 1000° C. or more, the control condition is set to allow the oxygen gas concentration to be maintained at 10 volume ppm or less, and allow the sum of the carbon monoxide gas concentration and the carbon dioxide gas concentration to be maintained at 0.1 volume % or less.

A maximum furnace atmosphere temperature may be set to any value in the range of 1000 to 1400° C., and the object may be held in this atmosphere temperature range for a time of 1 to 10 hours.

In the course of cooling, after the furnace atmosphere temperature is reduced to less than 1000° C., the burning is fundamentally performed in a nitrogen gas atmosphere until end thereof, in order to prevent oxidation of the object due to air intruding from outside the furnace. During the cooling, no gas is generated from the object. Thus, the control for suppressing intrusion of ambient air into the furnace may be performed in a furnace atmosphere temperature range of 1000 to 300° C. Preferably, as a rough guide, the furnace atmosphere during the cooling is controlled to allow the oxygen gas concentration to be maintained at 1000 volume ppm or less, and allow the sum of the carbon monoxide gas concentration and the carbon dioxide gas concentration to be maintained at 1.0 volume % or less. Further, in view of saving nitrogen gas, the cooling may be performed by introducing ambient air, in the furnace atmosphere temperature range of less than 300° C. In this case, an influence on the oxidation is insignificant.

In a batch furnace, it is preferable to perform an operation of replacing the furnace atmosphere with nitrogen gas during supply of nitrogen gas in a conventional usual manner.

During burning in a continuous furnace such as a tunnel kiln, nitrogen gas may be supplied to form a nitrogen gas stream directing from the side of an outlet toward an inlet of the furnace. This allows gas generated from the object at 1000° C. or less to flow toward a lower temperature region, so that a nitrogen gas concentration in the atmosphere at 1000° C. or more can be maintained at a high value. Fundamentally, in the continuous furnace, it is preferable that the furnace atmosphere is set to a nitrogen gas atmosphere at a position where a carriage is inserted in the furnace. However, in view of saving nitrogen gas, only a position having a furnace atmosphere temperature of 300° C. or more may be placed in a nitrogen gas atmosphere, and a position having a furnace atmosphere temperature of less than 300° C. may be placed in an ambient air atmosphere. Further, in a low furnace atmosphere temperature range of 800° C. or less, it is preferable to provide a degreasing zone to remove gas generated from the object.

In cases where a thermosetting resin such as a phenolic resin is used as the organic binder, the object may be placed in an additional furnace and subjected to a heat treatment in an ambient atmosphere at a temperature of 300 to 100° C. which is less likely to cause oxidation of aluminum, so as to preliminarily remove a solvent and water as a reaction product.

In burning to be performed under a condition that a shaped body is buried in carbon particles such as coke particles, an amount of formed aluminum nitride is small, and crack is likely to occur during the burning. Thus, this technique cannot be employed in the present invention. In the present invention, burning is performed without using carbon particles and under a nitrogen gas atmosphere where each concentration of oxygen gas, carbon monoxide gas and carbon dioxide gas is maintained at an extremely low value.

Example 1

Table 1 (shown as FIG. 3) shows Inventive Examples and Comparative Examples. A phenolic resin was added to a refractory raw material mixture illustrated in Table 1 in a given amount which is not included in 100 mass % of the refractory raw material mixture, and they were kneaded. Then, the kneaded mixture was formed into a shaped body for a plate brick, using a hydraulic press.

In Inventive Example 1 illustrated in Table 1, burning was performed using a closed-type batch furnace (electric furnace). The shaped body was placed in the furnace, and the burning was started under a condition that an oxygen concentration in the furnace was set to 1000 volume ppm or less by replacing a furnace atmosphere with nitrogen gas. During heating, nitrogen gas was continually supplied while discharging gas generated in the furnace and an excess part of the nitrogen gas to an outside of the furnace. As a burning temperature becomes higher, the oxygen concentration is lowered, and each of a carbon monoxide gas concentration and a carbon dioxide gas concentration is increased due to decomposition of the phenolic resin and others. However, the furnace atmosphere was held at 900° C. for 2 hours in the middle of the heating, wherein an supply amount of nitrogen gas and a discharge amount of furnace gas were adjusted to allow the oxygen gas concentration to be set to 100 volume ppm or less, and allow a sum of the carbon monoxide gas concentration and the carbon dioxide gas concentration to be set to 1.0 volume % or less. Subsequently, the furnace atmosphere temperature was increased under the above gas concentration condition, and the furnace atmosphere was held at a maximum temperature (burning temperature) of 1300° C. for 3 hours. It took 20 hours for heating from room temperature to 1300° C. Subsequently, the heating was stopped, and the furnace atmosphere was cooled to 150° C. under a condition that the oxygen gas concentration is maintained at 100 volume ppm or less, and the sum of the carbon monoxide gas concentration and the carbon dioxide gas concentration is maintained at 1.0 volume % or less, while supplying nitrogen gas to allow a furnace pressure to be increased to a value greater than an ambient pressure. Then, at 150° C., a burned product was taken out from the furnace. In the Inventive Example 1, the nitrogen gas had an $N_2$ purity of 99.99% or more, an oxygen gas concentration of 5 volume ppm or less, and a sum of a carbon monoxide gas concentration and a carbon dioxide gas concentration of 100 volume ppm or less.

A pipe was installed inside the furnace to collect furnace gas so as to measure a furnace gas concentration. Further, the supply amount of nitrogen gas and the discharge amount of furnace gas were controlled by continuously measuring the furnace gas concentration using an electrochemical oxygen gas concentration meter and an infrared carbon-dioxide analyzer. Further, the oxygen gas concentration, the carbon monoxide gas concentration and the carbon dioxide gas concentration were controlled by supplying oxygen gas, carbon monoxide gas and carbon dioxide gas. Considering measurement accuracy of the measuring devices, the oxygen gas concentration was measured down to one volume ppm, and each of the carbon monoxide gas concentration and the carbon dioxide gas concentration was measured down to 0.1 volume %.

In Table 1, the oxygen gas concentration and the sum of the carbon monoxide gas concentration and the carbon dioxide gas concentration are measurement results at 1300° C.

In each of Inventive Examples 2 and 3, and Comparative Examples 1 and 2, the same shaped body as that in the Inventive Example 1 was used, and the supply amount of nitrogen gas and the discharge amount of furnace gas were adjusted from 1000° C. while supplying a small amount of oxygen gas to control the oxygen gas concentration, so as to have gas concentrations illustrated in Table 1. In each of Inventive Examples 4 and 5, and Comparative Examples 3 and 4, the same shaped body as that in the Inventive Example 1 was used, and gas containing carbon monoxide gas and carbon dioxide gas adjusted to 1:1 was supplied from 1000° C. to adjust each gas concentration to a given value. A burning condition in Inventive Examples 6 to 10, and Comparative Example 5 was set to be the same as that in the Inventive Example 1. Cooling in the Inventive Examples 2 to 10, and the Comparative Examples 1 to 5 was performed under the same condition as that in the Inventive Example 1

In the Comparative Example 5, the shaped body was burned under a condition that it is buried in a coke powder using a silicon carbide container in another tunnel gas kiln, and a burning temperature was set to be the same as that in the Inventive Examples.

In Table 1, the fused alumina was a type comprising 99 mass % of $Al_2O_3$, and the calcined alumina was a type comprising 99 mass % of $Al_2O_3$. Further, the zirconia-mullite was a type comprising 55 mass % of $Al_2O_3$, 38 mass % of $ZrO_2$ and 17 mass % of $SiO_2$. Each of the Al powder, the Al—Si powder and the Al—Mg powder had a particle size of 200 μm or less. In each of the Inventive and Comparative Examples, the zirconia-mullite was mixed in an amount of 33 mass %. In other words, the refractory raw material mixture in each of the Inventive and Comparative Examples contains a $ZrO_2$ component in an amount of 13 mass %.

An amount of formed aluminum nitride was quantitatively determined by an internal reference method based on X-ray diffraction. The amount of formed aluminum nitride illustrated in Table 1 is obtained as a result of burning. In cases where the refractory raw material mixture contains no aluminum nitride, it corresponds to an amount of aluminum nitride contained in a plate brick.

The nitrogen content was quantitatively determined by a thermal conductivity method, using a simultaneous oxygen & nitrogen analyzer (produced by LECO Co.). The carbon content was evaluated by the method for chemical analysis of refractory bricks, described in JIS R2011.

The apparent porosity was evaluated by the measuring method for apparent porosity of refractory bricks, described in JIS R2205.

The oxidation resistance was evaluated by oxidizing a sample in ambient air at 800° C. for 2 hours using a rotary furnace, blasting abrasive grains onto the oxidized sample according to the British Standard Method, and expressing the result as an index on an assumption that the result of a sample of the Inventive Example 1 is 100. A smaller value indicates higher oxidation resistance.

Figure 2:
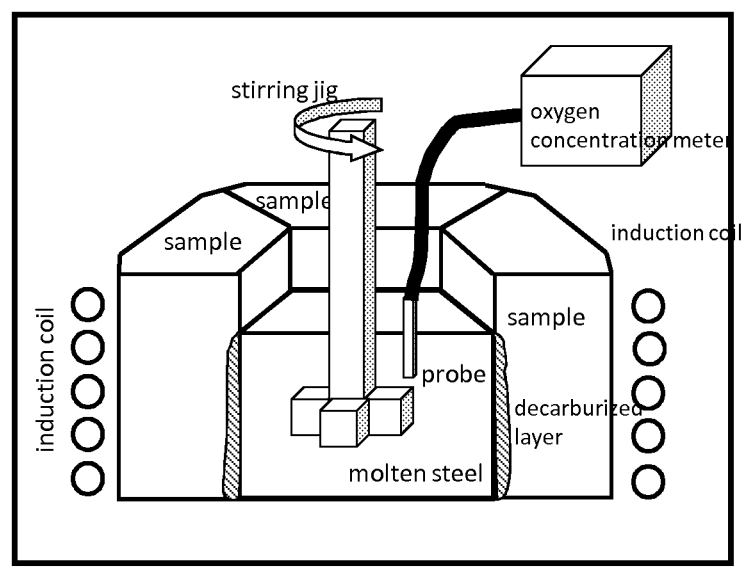
FIG. 2 is an explanatory diagram showing an oxidation resistance evaluation method using a high-frequency induction furnace.

Further, the oxidation resistance was evaluated by the oxidation resistance evaluation method disclosed in the JP 2009-204594A. Specifically, as shown in FIG. 2, a refractory product as a sample lined on a reaction vessel (not shown) of a high-frequency induction furnace was subjected to a reaction with molten steel received in the reaction vessel and adjusted to have an oxygen concentration of 30 to 120 mass ppm and a temperature of 1550 to 1650° C., for 300 minutes, and a thickness of a decarburized layer formed in an operating surface (steel bath region) by the reaction was evaluated. In this oxidation resistance evaluation, an oxygen concentration of the molten steel was adjusted to fall within the range of 30 to 120 mass ppm, by measuring the oxygen concentration using an oxygen concentration meter. Further, the molten steel was stirred by a stirring jig.

The hydration resistance was evaluated by measuring a weight-increasing rate of a sample using an autoclave, and expressing the weight-increasing rate on an assumption that the weight-increasing rate of a sample of the Inventive Example 1 is 100. As the hydration resistance, a hydration reaction-induced weight-increasing rate as measured after holding at 150° C. for 3 hours under a pressure of 0.49 MPa, in a hydration test using an autoclave, was also checked. A smaller value in each of the above hydration resistance evaluations indicates higher hydration resistance.

As an evaluation of surface roughening in an actual furnace, five plate bricks were prepared for each type of plate brick in Table 1, and placed in a ladle of the same steel plant. Then, after use in three casting cycles, a sliding surface of each of the plate bricks was visually checked to determine whether the plate brick is usable, based on a level of surface roughening. An average number of usable cycles of the five plate bricks is shown in Table 1.

In the Inventive Examples 1 to 3 where each plate brick is produced under a different oxygen concentration, the amount of formed aluminum nitride is reduced as the oxygen concentration becomes higher. However, the amount of formed aluminum nitride is 1.5 mass % or more, and the thickness of the decarburized layer in the oxidation resistance evaluation using the high-frequency induction furnace is small, specifically, 1500 μm or less, which means that the Inventive Examples 1 to 3 are excellent in oxidation resistance. In contrast, in the Comparative Examples 1 and 2 where the oxygen concentration is beyond the range of the present invention, the amount of formed aluminum nitride is less than 1.5 mass %, and the thickness of the decarburized layer in the oxidation resistance evaluation using the high-frequency induction furnace is large, specifically, greater than 1500 μm, which means that the Comparative Examples 1 and 2 are inferior in oxidation resistance to the Inventive Examples 1 to 3. It is assumed that the Comparative Examples 1 and 2 are inferior in oxidation resistance because aluminum is transformed into aluminum oxide by a small amount oxygen gas, and the aluminum oxide hinders the formation of aluminum nitride. In the surface-roughening evaluation result in an actual furnace, the number of usable cycles is 4.4 in the Comparative Example 1, and 3.2 in the Comparative Example, which are inferior as compared with 5.0 to 5.4 in the Inventive Examples 1 to 3. Further, in the Inventive Examples 1 to 3, the amount of formed aluminum nitride is 7.0 mass % or less, and the weight-increasing rate in the hydration test using an autoclave is 0.5% or less, which means that the Inventive Examples 1 to 3 are also excellent in hydration resistance. This shows that it is desirable to maintain the oxygen gas concentration in the furnace at 100 volume ppm or less.

In the Inventive Examples 4 and 5, the sum of the carbon monoxide gas concentration and the carbon dioxide gas concentration is 0.5 volume % and 1.0 volume %, which falls within the range of the present invention. In each of the Inventive Examples 4 and 5, the amount of formed aluminum nitride is 1.5 mass % or more, and the thickness of the decarburized layer in the oxidation resistance evaluation using the high-frequency induction furnace is small, specifically, 1500 μm or less, which means that the Inventive Examples 4 and 5 are excellent in oxidation resistance. Further, in the Inventive Examples 4 and 5, the amount of formed aluminum nitride is 7.0 mass % or less, and the weight-increasing rate in the hydration test using an autoclave is 0.5% or less, which means that the Inventive Examples 4 and 5 are also excellent in hydration resistance. As above, the Inventive Examples 4 and 5 are excellent in oxidation resistance and hydration resistance, and the number of usable cycles of plate bricks in an actual furnace is 5.0, which means that the Inventive Examples 4 and 5 are excellent in durability.

In contrast, in the Comparative Examples 3 and 4 where the sum of the carbon monoxide gas concentration and the carbon dioxide gas concentration is 2.0 volume % and 5.0 volume % which are beyond the range of the present invention, the amount of formed aluminum nitride is less than 1.5 mass %, and the thickness of the decarburized layer in the oxidation resistance evaluation using the high-frequency induction furnace is greater than 1500 μm, i.e., the oxidation resistance deteriorates. Moreover, the weight-increasing rate in the hydration test using an autoclave is greater than 0.5%, i.e., the hydration resistance also deteriorates. From this result, it is assumed that aluminum carbide is formed although the amount of formed aluminum nitride is 7.0 mass % or less. The number of usable cycles of plate bricks in an actual furnace is 3.2, which is significantly inferior to the Inventive Examples.

In the Comparative Example 5 where an aluminum nitride powder is added to the refractory raw material mixture without using aluminum or an aluminum alloy, the oxidation resistance is inferior as compared with the Inventive Examples, and the number of usable cycles of plate bricks in an actual furnace is small.

In the Comparative Example 6 where a shaped body is burned under the condition that it is buried in a coke powder using a silicon carbide container in another tunnel gas kiln, the amount of formed aluminum nitride is less than 1.5 mass %, and the thickness of the decarburized layer in the oxidation resistance evaluation using the high-frequency induction furnace is large, specifically, greater than 1500 μm, which means that the Comparative Example 6 is inferior in oxidation resistance to the Inventive Examples. Moreover, the weight-increasing rate in the hydration test using an autoclave is greater than 0.5%. From this result, it is assumed that aluminum carbide is formed although the amount of formed aluminum nitride is 7.0 mass % or less. Further, crack occurs in a burned product. It is assumed that this crack is due to reduction of zirconia by burning under a strong reducing atmosphere.

In the Inventive Examples 6 and 7 where the Si powder is added to the refractory raw material mixture, the weight-increasing rate in the hydration test using an autoclave is 0.3% or less, which shows that the hydration resistance is improved as compared with the Inventive Example 1. The Inventive Example 8 where the Al—Si powder is added to the refractory raw material mixture, and the Inventive Example 9 where the Al—Mg powder is added to the refractory raw material mixture, had results equivalent to those in the Inventive Examples using the Al powder.

In the Inventive Example 10, a burning condition is set to be the same as that in the Inventive Example 1, and an amount of the Al powder is increased. The amount of formed aluminum nitride is 1.5 mass % or more, and the thickness of the decarburized layer in the oxidation resistance evaluation using the high-frequency induction furnace is small, specifically, 1500 μm or less, which means that Inventive Example 10 is excellent in oxidation resistance. However, the amount of formed aluminum nitride is greater than 7.0 mass %, and the weight-increasing rate in the hydration test using an autoclave is greater than 0.5%, which means that the hydration resistance is apt to deteriorate. Thus, it can be said that it is preferable to suppress the amount of formed aluminum nitride to be 7.0 mass % or less.

What is claimed is:

1. A plate brick comprising aluminum nitride in an amount of 1.5 to 7.0 mass %, the aluminum nitride shaped as a fiber and having a diameter of 0.1 to 0.2 μm and wherein the plate brick, in a hydration test using an autoclave, has a hydration reaction-induced weight-increasing rate of 0.5% or less as measured after holding at 150° C. for 3 under a pressure of 0.49 MPa.

2. The plate brick as defined in claim 1, wherein a thickness of a decarburized layer in an operating surface thereof is 1500 μm or less as measured after a reaction with molten steel adjusted to have an oxygen concentration of 30 to 120 mass ppm and a temperature of 1550 to 1650° C., for 300 minutes.

3. A plate brick comprising aluminum nitride in an amount of 1.5 to 7.0 mass %, the aluminum nitride shaped as a fiber and having a diameter of 0.1 to 0.2 μm and wherein the plate brick, in a hydration test using an autoclave, has a hydration reaction-induced weight-increasing rate of 0.5% or less as measured after holding at 150° C. for 3 under a pressure of 0.49 MPa, the plate brick made by:

adding an organic binder to a refractory raw material mixture containing aluminum and/or an aluminum alloy;

kneading the organic binder and the refractory raw material mixture to form a kneaded mixture;

forming the kneaded mixture into a shaped body; and burning the shaped body in a nitrogen gas atmosphere at a temperature of 1000 to 1400° C., wherein when a temperature of a furnace atmosphere is 300° C. or more, the furnace atmosphere is set to a nitrogen gas atmosphere; and when the temperature of the furnace atmosphere is a 1000° C. or more, an oxygen gas concentration in the furnace atmosphere is maintained at 100 volume ppm or less, and a sum of a carbon monoxide gas concentration and a carbon dioxide gas concentration is maintained at 1.0 volume % or less.

4. The plate brick as defined in claim 3, wherein the refractory raw material mixture further comprises one or more selected from the group consisting of zirconia, zirconia-mullite, and alumina-zirconia, in an amount of 4 to 20 mass %, as a $ZrO_2$ component.

5. The plate brick as defined in claim 4, wherein the refractory raw material mixture further comprises silicon in an amount of 0.5 to 5 mass %.

* * * * *